United States Patent
Moll

(10) Patent No.: US 10,041,520 B2
(45) Date of Patent: Aug. 7, 2018

(54) HOLDER ASSEMBLY FOR WIPER ASSEMBLIES

(71) Applicant: TRICO PRODUCTS CORPORATION, Rochester Hills, MI (US)

(72) Inventor: Kyle Moll, Oxford, MI (US)

(73) Assignee: Trico Products Corporation, Rochester Hills, MI (US)

(*) Notice: Subject to any disclaimer, the term of this patent is extended or adjusted under 35 U.S.C. 154(b) by 1158 days.

(21) Appl. No.: 13/723,415

(22) Filed: Dec. 21, 2012

(65) Prior Publication Data

US 2014/0178122 A1 Jun. 26, 2014

(51) Int. Cl.
| F16B 2/22 | (2006.01) |
| F16B 7/04 | (2006.01) |
| B60S 1/38 | (2006.01) |

(52) U.S. Cl.
CPC .............. *F16B 7/0433* (2013.01); *F16B 2/22* (2013.01); *B60S 2001/3898* (2013.01); *Y10T 403/30* (2015.01)

(58) Field of Classification Search
CPC ................. B60S 1/0491; B60S 1/3848; B65D 2585/6885; B65D 75/22; B65D 75/225; B65D 75/36; B65D 75/566; B65D 43/162; B65D 59/04; B65D 85/54; B65D 85/00; B65D 85/68; B65D 85/08
USPC .......... 15/250.001, 250.361, 250.31, 257.01; 206/1.5, 349, 443, 427, 480, 461, 467, 206/469
See application file for complete search history.

(56) References Cited

U.S. PATENT DOCUMENTS

| 6,675,433 | B1 | 1/2004 | Stewart et al. |
| 6,779,661 | B1 | 8/2004 | Kotlarski |
| 2006/0282973 | A1 | 12/2006 | Chang |
| 2008/0245691 | A1 | 10/2008 | Kim |
| 2009/0025174 | A1 | 1/2009 | Braun et al. |
| 2009/0049638 | A1* | 2/2009 | Jehannet ............... B60S 1/3848 15/250.32 |

FOREIGN PATENT DOCUMENTS

| CN | 102196971 A | 9/2011 | |
| DE | 102004013508 A1 | 10/2005 | |
| FR | 2875486 | 3/2006 | |
| FR | 2900133 | 10/2007 | |
| FR | 2936783 | 4/2010 | |
| FR | 2968643 A1 * | 6/2012 | ............ B65D 85/54 |
| WO | 2009/084959 A1 | 7/2009 | |
| WO | WO 2010037541 A2 * | 4/2010 | ............ B65D 85/54 |
| WO | 2012095194 A1 | 7/2012 | |

OTHER PUBLICATIONS

Apr. 15, 2014 International Search Report and Written Opinion for PCT/US2013/076064.

* cited by examiner

*Primary Examiner* — Christopher M Koehler
*Assistant Examiner* — Stephanie Berry
(74) *Attorney, Agent, or Firm* — Miller Canfield

(57) ABSTRACT

A holder assembly for holding multiple wiper assemblies includes a plurality of end spacers adapted to contact and separate wiper assemblies at a toe and heal thereof and a center clamp adapted to be disposed about and retain the wiper assemblies together.

11 Claims, 6 Drawing Sheets

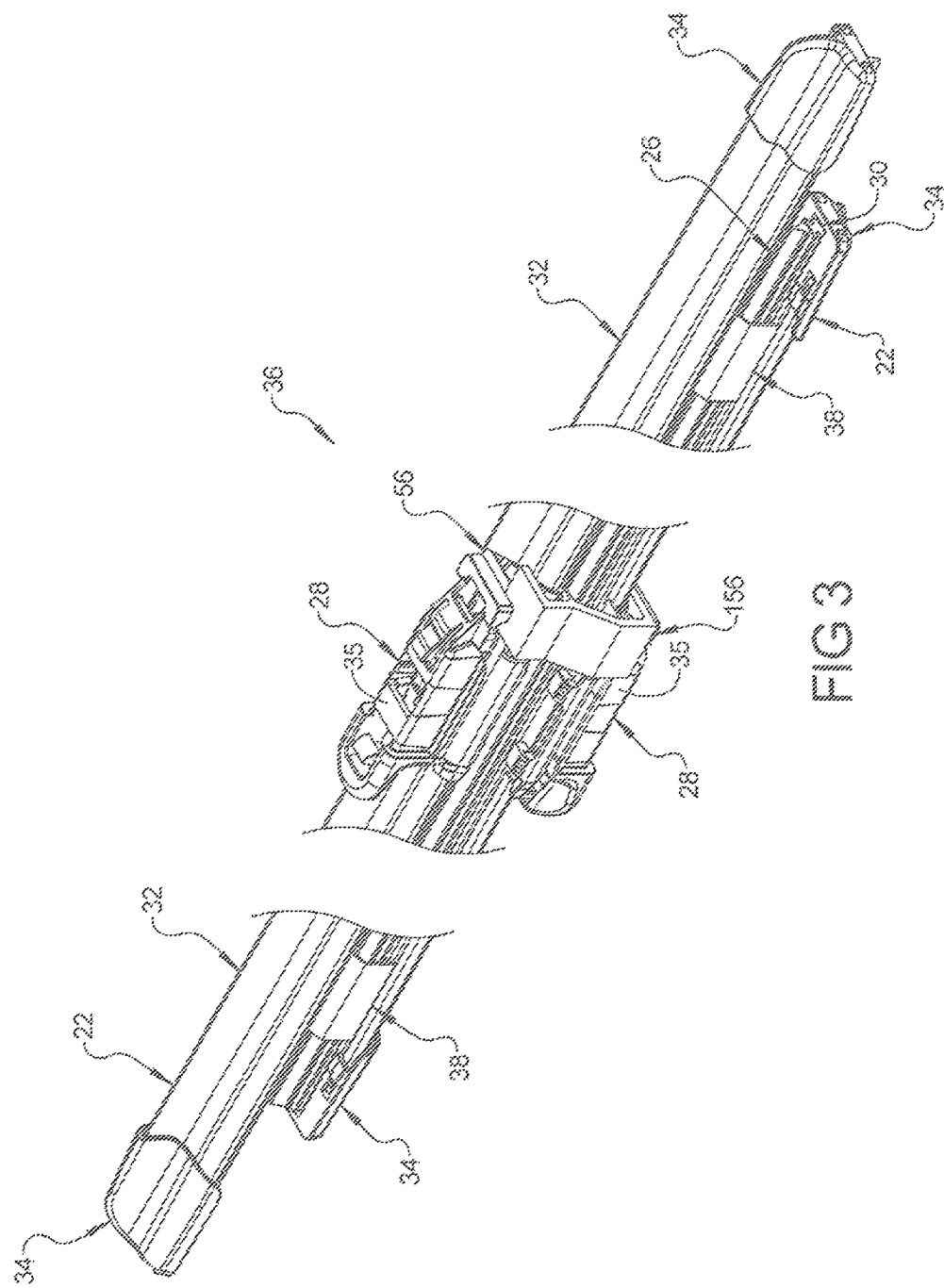

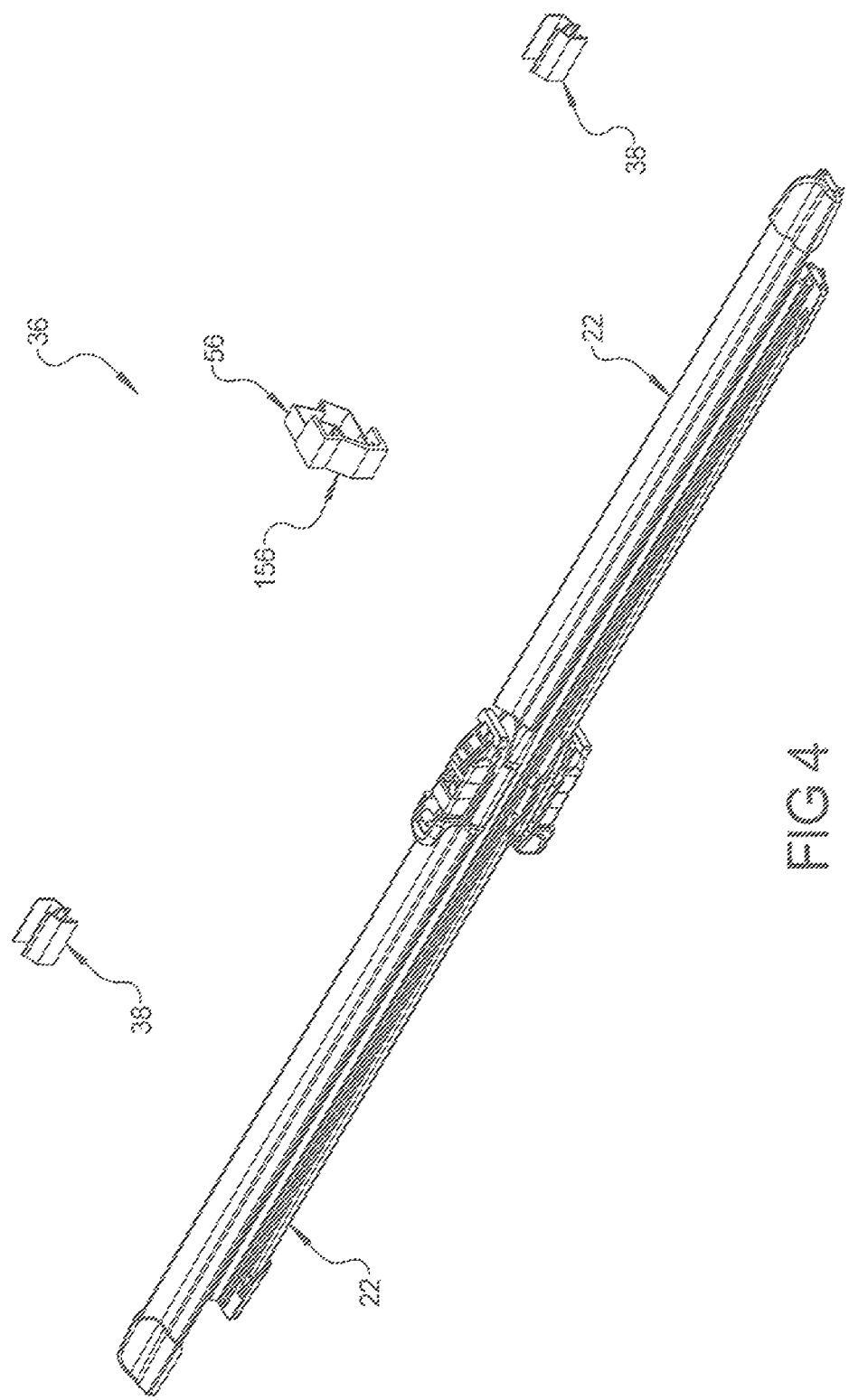

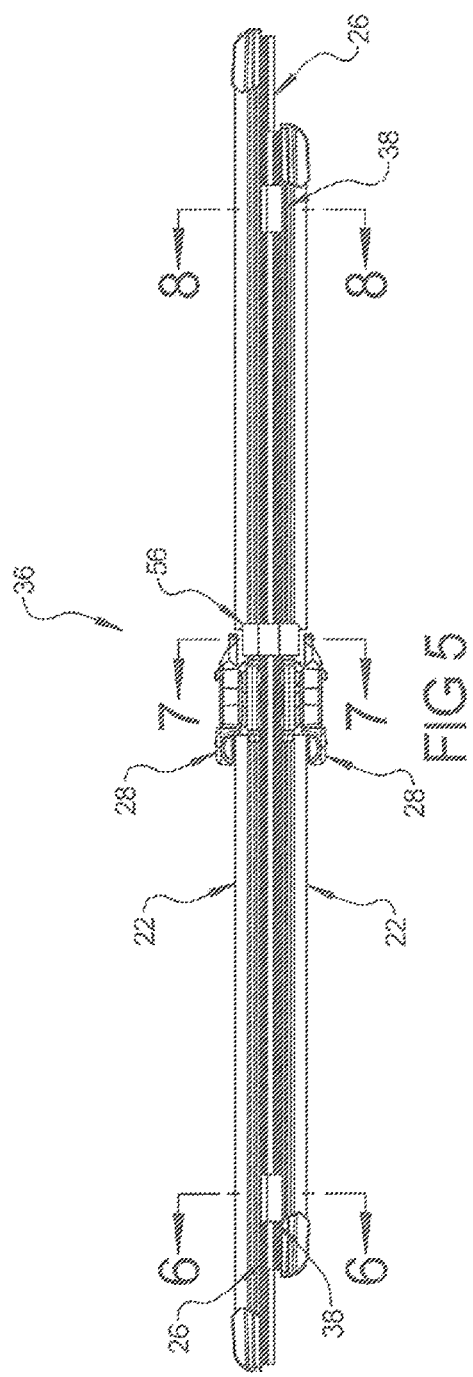
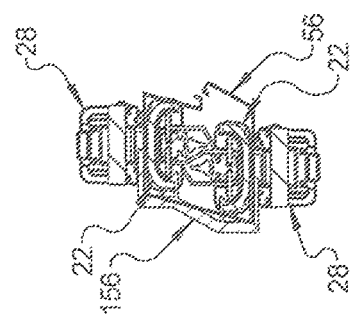
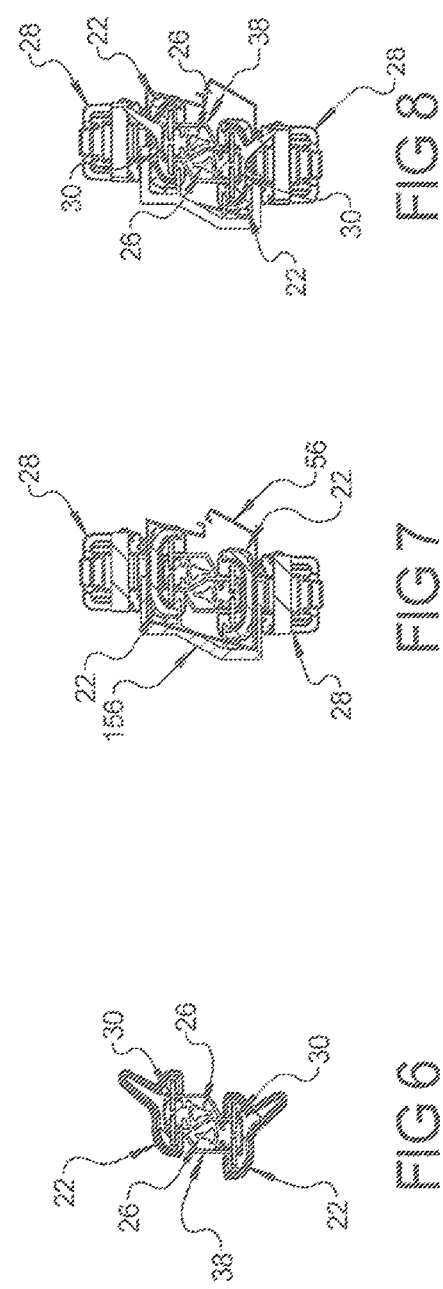

US 10,041,520 B2

HOLDER ASSEMBLY FOR WIPER ASSEMBLIES

BACKGROUND OF THE INVENTION

1. Field of the Invention

The present invention relates generally to wiper assemblies for vehicles and, more specifically, to a holder assembly for a plurality of wiper assemblies to be disposed in a packaging assembly.

2. Description of the Related Art

Conventional wiper assemblies for a vehicle known in the related art include some type of wiper assembly mounted to an arm which, in turn, is mounted adjacent a surface to be wiped such as a windshield of the vehicle and pivotally driven to impart reciprocating motion to the wiper assembly across the windshield. The wiper assembly typically includes a rubber wiping element that contacts the windshield across the surface to be wiped. Generally, a wiper assembly may be classified into one of two categories commonly referred to as "tournament-style" wiper assemblies and "beam-blade" wiper assemblies.

Beam-blade style wiper assemblies include a single elongated, homogeneous strip forming a spring backbone. The backbone is operatively coupled to the wiper arm by a fixed connecting formation at a central position. In a beam-blade style wiper assembly, the reciprocally driven wiper arm applies a downward force and moves the wiper assembly across the surface to be wiped, which is generally a windshield. The backbone is curved along a single plane which is the same plane of curvature as that defined by the windshield. The wiping element is fixedly secured to the backbone. One example of a beam-blade style wiper assembly can be found in U.S. Pat. No. 6,675,433 issued to Stewart, et al., on Jan. 13, 2004 and assigned to the Assignee of the present invention, Trico Products Corporation.

When the wiping element is worn out or lowered in contacting or wiping force due to long term use, it is necessary to replace it with a new wiper assembly, which is generally encased in a separate packaging case and sold therewith. However, the packaging case typically requires the wiper assembly to be straightened, which causes the wiper assembly to slide down in the packaging case. As such, the wiper assembly accommodated in the packaging case is likely to experience scratching, peeling-off of paint, and the like due to contact with the packaging case during delivery or distribution. In addition, if the wiper assembly is accommodated in a curved shape corresponding to a rounded face of the windshield, the packaging case occupies a large volume in a packaging state, causing an increase in delivery and distribution costs, which is undesired.

Accordingly, there is a need in the art for an assembly that holds multiple wiper assemblies together for a packaging assembly that allows for straightening of the wiper assemblies for being disposed in a packaging assembly. There is also a need in the art for an assembly that packages the wiper assemblies close together while keeping the wiping element protected from damage while being shipped in a packaging assembly. In addition, there is a need in the art for a holder assembly that is designed for multiple beam blade-style wiper assemblies.

SUMMARY OF THE INVENTION

The present invention overcomes many limitations and disadvantages in the related art in a holder assembly for holding multiple wiper assemblies. The holder assembly includes a plurality of end spacers adapted to contact and separate wiper assemblies at a toe and heal thereof. The holder assembly also includes a center clamp adapted to be disposed about and retain the wiper assemblies together.

One advantage of the present invention is that the holder assembly straightens and holds multiple wiper assemblies together for shipping in a single packaging assembly. Another advantage of the present invention is that the holder assembly packages a pair of wiper assemblies close together while keeping the wiping element protected from damage while being shipped. Yet another advantage of the present invention is that the holder assembly acts as a shipping straightener for a pair of wiper assemblies and utilizes just three components of two end spacers and a center clamp. Still another advantage of the present invention is that the holder assembly has end spacers that separate the wiper assemblies at the toe and heel while keeping the wiping elements orientated and offset from each other. A further advantage of the present invention is that the holder assembly has a center clamp that retains the wiper assemblies together and straight for shipping by utilizing the curvature of the r assemblies. Yet a further advantage of the present invention is that the holder assembly is used with a pair of beam blade-style wiper assemblies.

Other objects, features, and advantages of the present invention will be readily appreciated as the same becomes better understood alter reading the subsequent description taken in connection with the accompanying drawings.

BRIEF DESCRIPTION OF THE DRAWINGS

FIG. 3 is an enlarged perspective view of the holder assembly and wiper assemblies of FIG. 2.

FIG. 4 is an exploded perspective view of the holder assembly and wiper assemblies of FIGS. 2 and 3.

FIG. 5 is an elevational view of the holder assembly and wiper assemblies of FIGS. 2 and 3.

FIG. 6 is a sectional view taken along line 6-6 of FIG. 5.

FIG. 7 is a sectional view taken along line 7-7 of FIG. 5.

FIG. 8 is a sectional view taken along line 8-8 of FIG. 5.

DETAILED DESCRIPTION OF THE PREFERRED EMBODIMENT(S)

Figure 1:
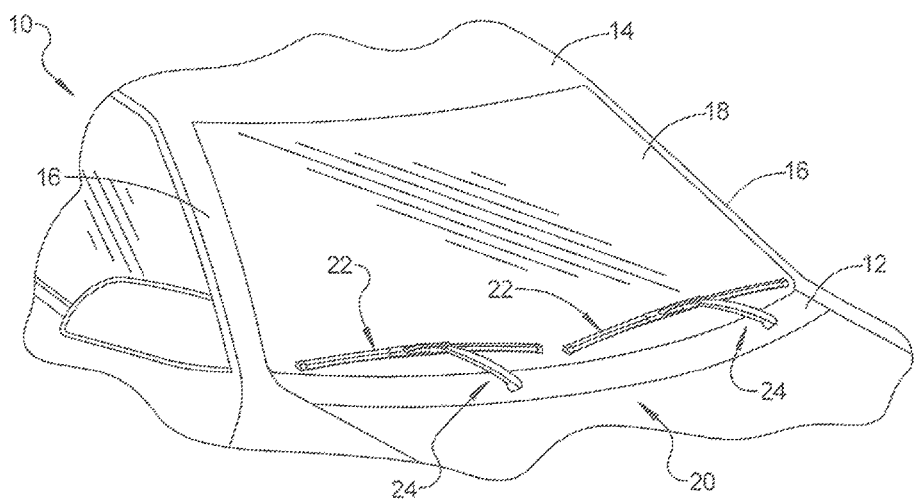
FIG. 1 is a partial perspective view of a front of a vehicle having a pair of wiper assemblies pivotally mounted for reciprocal movement across a surface of the vehicle.

Referring now to the figures, where like numerals are used to designate like structure, a portion of a vehicle is illustrated at 10 in FIG. 1. The portion of the vehicle 10 includes a body having a cowl 12, a roof 14, and a pair of laterally spaced front or "A" pillars 16 extending between the roof 14 and the cowl 12. The A-pillars 16, roof 14, and cowl 12 cooperate to define a generally rectangular perimeter, which supports a curved or "swept back" windshield 18.

A wiper system is generally indicated at 20 in FIG. 1 and is employed to clean the windshield 18. In the representative example illustrated herein, the wiper system 20 includes a pair of wiper assemblies, generally indicated at 22, which correspond to the driver and passenger side of the vehicle 10. However, those having ordinary skill in the art will appreciate that the wiper system 20 could employ a single wiper assembly 22 without departing from the scope of the present invention. Each wiper assembly 22 (hereinafter "wiper assembly") is carried by a corresponding wiper arm assembly, generally indicated at 24. The wiper arm assembly 24 includes an attachment member (not shown) adapted to operatively engage the wiper assembly 22. The wiper system 20 also includes an electrical motor (not shown but generally known in the art) to power the wiper system 20 to move the wiper assemblies 22 in an oscillating manner across the surface of the windshield 18.

While the wiper assembly 22 illustrated in FIG. 1 is shown in connection with the front windshield 18 of the vehicle 10, those having ordinary skill in the art will appreciate that wiper assembly 22 may be employed in other areas of the vehicle 10, such as a rear window (not shown) or a head lamp (not shown) that employs a wiper system. Thus, it will be understood that the present invention is not limited for use solely in connection with wiper arm assemblies 24 and wiper assemblies 22 adapted for use on a vehicle's windshield 18, but for use in all applications where wiper arm assemblies 24 and wiper assemblies 22 are employed.

Figure 2:
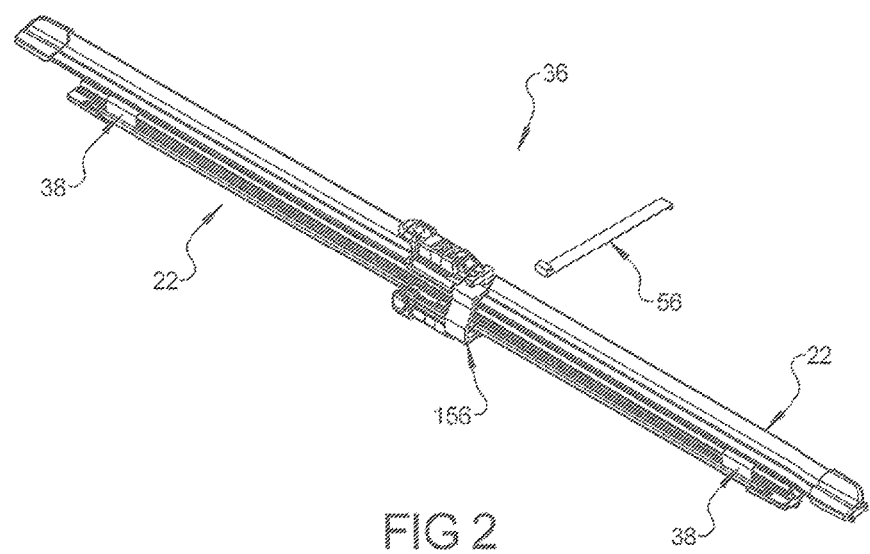
FIG. 2 is a perspective view of a holder assembly, according to the present invention, for a pair of wiper assemblies to replace the wiper assemblies of FIG. 1.
Figure 9:
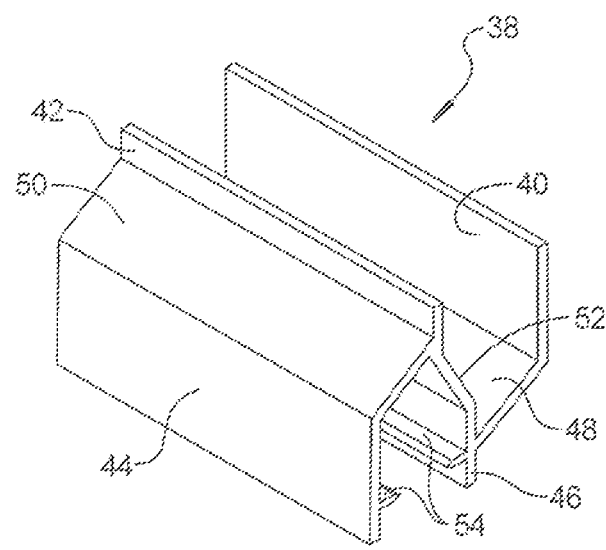
FIG. 9 is a perspective view of one end spacer of the holder assembly of FIGS. 2 through 5.
Figure 10:
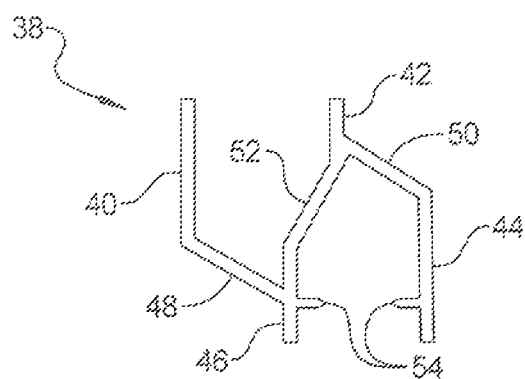
FIG. 10 is an end elevational view of the end spacer of FIG. 9.
Figure 11:
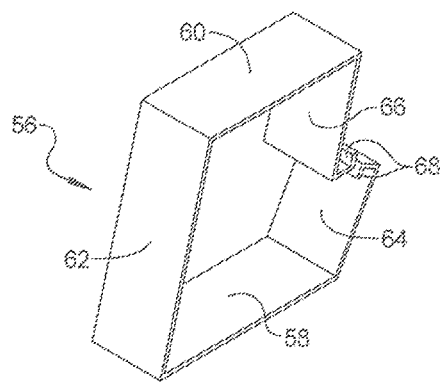
FIG. 11 is a perspective view of a center clamp for the holder assembly of FIGS. 2 through 5.
Figure 12:
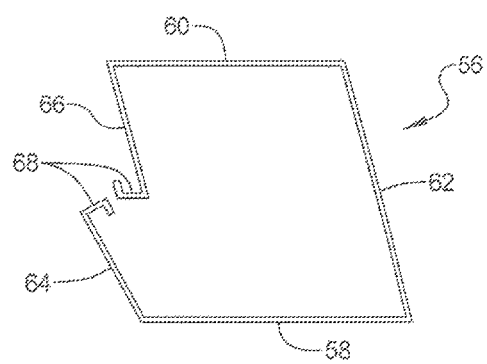
FIG. 12 is a side elevational view of the center clamp of FIG. 11.

Referring to FIGS. 2 and 3, the wiper assembly 22 includes a wiping element, generally indicated at 26, that is adapted to contact the surface of the vehicle 10 to be wiped, in this representative example, the windshield 18. In addition, the wiper assembly 22 generally includes a coupler assembly, generally indicated at 28, that acts to interconnect the wiper arm assembly 24 and the wiping element 26. The wiper assembly 22 also includes at least one elongated beam 30 that defines a longitudinal axis and that acts to support the wiping element 26. The wiper assembly 22 may also include an airfoil assembly, generally indicated at 32, and a pair of end caps, generally indicated at 34. It should be appreciated that the coupler assembly 28 is adapted to connect the wiper assembly 22 to the wiper arm assembly 24 in any suitable manner commonly known in the art. It should also be appreciated that the coupler assembly 28 includes structure that corresponds to at least one particular type of attachment member of the wiper arm assembly 24, but may include structure that corresponds to multiple types of attachment members. By way of example, different OEM's employ wiper arm assemblies having different attachment members adapted to operatively engage a specific beam-blade style wiper assembly. Accordingly, the coupler assembly 28 illustrated herein includes structure that operatively engages at least one or more of these different attachment members. Further by way of example, certain wiper arm assemblies employed by OEM's include "bayonet-style"; "pin-type"; or "hook-type" attachment members of various sizes that operatively engage the wiper assemblies 22. Accordingly, the coupler assembly 28 illustrated herein may include an adapter 35 for operatively engaging at least one or more of these different attachment members for use in connection with the wiper assemblies 22 without departing from the scope of the present invention. It should be appreciated that, while a particular coupler assembly 28 is illustrated herein, any suitable coupler assembly 28 may be used to interconnect the wiper arm assembly 24 and the wiping element 26 without departing from the scope of the present invention.

Referring to FIGS. 2 through 8, one embodiment of a holder assembly, according to the present invention and generally indicated at 36, for holding multiple wiper assemblies 22 is shown. In the embodiment illustrated, the holder assembly 36 is used to straighten and hold a pair of wiper assemblies 22 together for shipping in a packaging assembly (not shown). The holder assembly 36 includes a plurality of end spacers, generally indicated at 38, that separate the wiper assemblies 22 at the toe and heel, while keeping the wiping elements 26 orientated and offset from each other. In the embodiment illustrated, two end spacers 38 are used. Each end spacer 38 includes a first upper member 40 extending vertically and a second upper member 42 extending vertically and spaced laterally from the first upper member 40. The first upper member 40 has a length greater than a length of the second upper member 42. Each end spacer 38 also includes a first lower member 44 extending vertically and a second lower member 46 extending vertically and spaced laterally from the first lower member 44. The first lower member 44 has a length greater than a length of the second lower member 46. Each end spacer further 38 includes a lower arm 48 interconnecting the first upper member 40 and the second lower member 46. The lower arm 48 is orientated at an angle greater than zero relative to the first upper member 40 and second lower member 46. Each end spacer 38 includes an upper arm 50 interconnecting the second upper member 42 and the first lower member 44. The upper arm 50 is orientated at an angle greater than zero relative to the second upper member 42 and first lower member 44. Each end spacer 38 includes an intermediate arm 52 interconnecting the second upper member 42 and the second lower member 46. The intermediate arm 52 is orientated at an angle greater than zero relative to the second upper member 42 and the second lower member 46. Each end spacer 38 includes a projection 54 extending inwardly from the first lower member 44 and second lower member 46 and opposing each other. The projections 54 are orientated generally perpendicular to the first lower member 44 and second lower member 46. Each of the end spacers 38 are made of a plastic material. Each of the end spacers 38 are integral, unitary, and one-piece and formed by conventional extrusion.

The holder assembly 36 includes at least one center clamp, generally indicated at 56, that is disposed longitudinally between the end spacers 38 and releasably holds and fastens the wiper assemblies 22 together. In the embodiment illustrated, one center clamp 56 is used. The center clamp 56 is generally rectangular in cross-sectional shape. The center clamp 56 includes a bottom wall 58, a top wall 60, and a side wall 62 interconnecting one side of the bottom wall 58 and top wall 60. The center clamp 56 also includes a lower front wall 64 extending upwardly from the other side of the bottom wall 58 and an upper front wall 66 extending downwardly from the other side of the top wall 60. The lower front wall 64 and upper front wall 66 each have a flange 68 extending from a free end thereof. The flange 68 is generally "U" shaped. It should be appreciated that the flanges 68 engage each other and are releasable from each other. The center clamp 56 is made of a plastic material. The center clamp 56 is integral, unitary, and one-piece and formed by conventional extrusion process.

In operation, the holder assembly 36 is used to straight and hold a pair of the wiper assemblies 22 together. As illustrated in FIGS. 2 through 8, the end spacers 38 are located near the ends of the wiper assemblies 22. The first upper arm 40 and second upper arm 42 contact the beam 30 of the upper wiper assembly 22 and the first lower arm 44 and second lower arm 46 contact the beam 30 of the lower wiper assembly 22. The projections 54 are disposed in the grooves of the wiping element 26 of the lower wiper assembly 22. The center clamp 56 is disposed about the coupler assemblies 28 of the wiper assemblies 22 and the flanges 68 engage each other in a closed position. In this way, the end spacers 38 are held in compression while the center clamp 56 is held in tension due to the curvature of the wiper assemblies 22.

Figure 13:
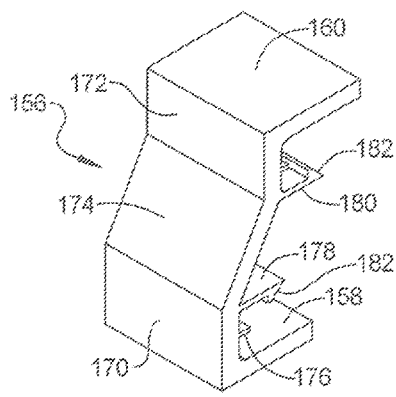
FIG. 13 is a perspective view of another embodiment, according to the present invention, of the center clamp for the holder assembly of FIGS. 2 through 5.
Figure 14:
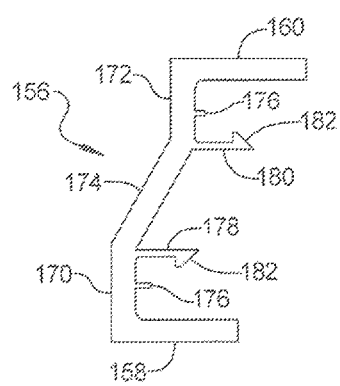
FIG. 14 is a side elevational view of the center clamp of FIG. 13.

In addition, the holder assembly 36 may include an optional or additional center clamp 156, according to the present invention, to hold the wiper assemblies 22 together. The center clamp 156 is another embodiment of the center clamp 56. As illustrated in FIGS. 13 and 14, the center clamp 156 has a bottom wall 158 and a top wall 160. The center clamp 156 also has a lower side wall 170 extending upwardly from the bottom wall 158 and an upper side wall 172 extending downwardly from the top wall 160. The center clamp 156 also has an intermediate side wall 174 extending between the lower side wall 170 and the upper side wall 172 at an angle greater than zero relative to the lower side wall 170 and the upper side wall 172. The center clamp 156 also includes a projection 176 extending from the lower side wall 170 and the upper side wall 172. The projections 176 are orientated substantially perpendicular to the lower side wall 170 and the upper side wall 172. The center clamp 156 includes a lower engaging member 178 extending inwardly from the lower side wall 170 and an upper engaging member 180 extending inwardly from the upper side wall 172. The lower engaging member 178 is orientated substantially perpendicular to the lower side wall 170 and the upper engaging member 180 is orientated substantially perpendicular to the upper side wall 172. The lower engaging member 178 and the upper engaging member 180 each have a projection 82 extending from a flee end thereof. The center clamp 156 is made of a plastic material. The center clamp 156 is integral, unitary, and one-piece and formed by conventional extrusion process.

In operation, the holder assembly 36 is used to straight and hold a pair of the wiper assemblies 22. As illustrated in FIGS. 2 through 8, the end spacers 38 are located near the ends of the wiper assemblies 22. The first upper arm 40 and second upper arm 42 contact the beam 30 of the upper wiper assembly 22 and the first lower arm 44 and second lower arm 46 contact the beam 30 of the lower wiper assembly 22. The projections 54 are disposed in the grooves of the wiping element 26 of the lower wiper assembly 22. The center clamp 56 is disposed about the coupler assemblies 28 of the wiper assemblies 22 and the flanges 68 engage each other in a closed position. The center clamp 156 may be used in addition to the center clamp 56 and is disposed such that the bottom wall 158 and the top wall 160 of the center clamp 156 partially overlap the bottom wall 58 and top wall 60 of the center clamp 56. The projections 176 of the center clamp 156 are disposed in grooves of the wiping elements 26 of the upper wiper assembly 22 and lower wiper assembly 22. The lower engaging member 178 and upper engaging member 180 of the center clamp 156 each have their projection 182 engaging a corresponding airfoil assembly 32 of the wiper assemblies 27.

In this way, the holder assembly 36 of the present invention straightens and holds multiple wiper assemblies 22 together for shipping in a single packaging assembly. The holder assembly 36 of the present invention packages a pair of wiper assemblies 22 close together while keeping the wiping elements 26 protected from damage while being shipped. The holder assembly 36 of the present invention acts as a shipping straightener for a pair of wiper assemblies 22 and utilizes just three components of two end spacers 38 and a center clamp 56, 156. The holder assembly 36 of the present invention has end spacers 38 that separate the wiper assemblies 22 at the toe and heel while keeping the wiping elements 26 orientated and offset from each other. The holder assembly 36 of the present invention has a center clamp 56, 156 that retains the wiper assemblies 22 together and straight for shipping by utilizing the curvature of the wiper assemblies 22. The holder assembly 36 of the present invention is used with a pair of beam blade-style wiper assemblies 22. In addition, the holder assembly 36 has relatively small parts, thereby reducing package size and cost.

The present invention has been described in an illustrative manner. It is to be understood that the terminology which has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:
1. A holder assembly for holding multiple curved wiper assemblies, said holder assembly comprising:
   a plurality of end spacers provided separate from each other and each adapted to be independently connected to curved wiper assemblies to separate the curved wiper assemblies at a respective toe and heal thereof that are located at opposite ends of the wiper assemblies, each of said end spacers including first and second spaces which open in opposite insertion directions to respectively receive the wiper assemblies within said first and second spaces, only said second space including projections which are disposed for engagement with a respective one of the wiper assemblies to restrain removal of the respective one of the wiper assemblies from said second space while said first space is free of projections engageable with the other of the wiper assemblies received in said first space; and
   a first center clamp which is provided separate from said end spacers and is adapted to be disposed about and retain the wiper assemblies together in a straightened condition, wherein said center clamp includes a bottom wall, a top wall spaced from said bottom wall to define a wall spacing, a side wall interconnecting one side of said top wall and said bottom wall, and a lower front wall extending upwardly from the other side of said bottom wall and an upper front wall extending downwardly from the other side of said top wall;
   and wherein said upper front wall and said lower front wall each have a flange extending from a free end thereof wherein said flanges of said upper front wall and said lower front wall are engagable with each other such that said top wall and said bottom wall are held at said wall spacing to releasably hold said wiper assemblies in a straightened condition and restrain the wiper assemblies within both of said first and second spaces of said end spacers wherein said end spacers are held in compression and said first center clamp is held in tension when the wiper assemblies are held in said straightened condition.

2. A holder assembly as set forth in claim 1 wherein each of said end spacers includes a first upper member extending vertically and a second upper member extending vertically and spaced laterally from said first upper member to define said first space for receiving a beam of one of the wiper assemblies.

3. A holder assembly as set forth in claim 2 wherein each of said end spacers includes a first lower member extending vertically and a second lower member extending vertically and spaced laterally from said first lower member to define said second space for receiving a beam of another one of the wiper assemblies.

4. A holder assembly as set forth in claim 3 wherein each of said end spacers includes a lower arm interconnecting said first upper member and said second lower member.

5. A holder assembly as set forth in claim 3 wherein each of said end spacers includes an upper arm interconnecting said second upper member and said first lower member.

6. A holder assembly as set forth in claim 3 wherein each of said end spacers includes an intermediate arm interconnecting said second upper member and said second lower member.

7. A holder assembly as set forth in claim 3 wherein each of said end spacers includes said projections extending inwardly from said first lower member and said second lower member and opposing each other within said second space wherein said projections are engagable with the respective wiper assembly to restrain the wiper assembly within said second space.

8. A holder assembly as set forth in claim 1 wherein said flange is generally "U" shaped and said flanges engage each other and are releasable from each other.

9. A holder assembly comprising:
a pair of end spacers provided separate from each other and each adapted to be independently connected to a beam of each of a pair of curved wiper assemblies to separate the wiper assemblies at a toe and heal thereof that are located at opposite ends of the wiper assemblies, each of said end spacers including first and second spaces which open in opposite insertion directions to respectively receive the wiper assemblies within said first and second spaces, only said second space including projections which are disposed for engagement with a respective one of the wiper assemblies to restrain removal of the respective one of the wiper assemblies in said second space while said first space is free of projections engageable with the other of the wiper assemblies received in said first space; and
a first center clamp which is provided separate from said end spacers and is adapted to be disposed about and retain the wiper assemblies together and to straighten the wiper assemblies for shipping in a package; and wherein said center clamp includes a bottom wall, a top wall spaced from said bottom wall to define a wall spacing, a side wall interconnecting one side of said top wall and said bottom wall, a lower front wall extending upwardly from the other side of said bottom wall, and an upper front wall extending downwardly from the other side of said top wall, wherein said upper front wall and said lower front wall each have a flange extending from a free end thereof and being generally "U" shaped to engage each other to fix said wall spacing and release from each other to permit the wiper assemblies to be inserted between said top wall and said bottom wall in a straightened condition, said first center clamp restraining the wiper assemblies within both of said first and second spaces of said end spacers and preventing removal of said wiper assemblies from said first and second spaces wherein said end spacers are held in compression and said first center clamp is held in tension when the wiper assemblies are disposed in said straightened condition.

10. A holder assembly as set forth in claim 9 wherein each of said end spacers includes a first upper member extending vertically, a second upper member extending vertically and spaced laterally from said first upper member to define said first space, a first lower member extending vertically, a second lower member extending vertically and spaced laterally from said first lower member to define said second space, a lower arm interconnecting said first upper member and said second lower member, an upper arm interconnecting said second upper member and said first lower member, an intermediate arm interconnecting said second upper member and said second lower member, and said projections extending inwardly from said first lower member and said second lower member and opposing each other to restrain the respective wiper assembly within said second space.

11. A holder assembly comprising:
a pair of separate end spacers adapted to contact a beam of each of a pair of wiper assemblies and to separate the wiper assemblies at a toe and heal thereof, each of said end spacers including a first upper member extending vertically, a second upper member extending vertically and spaced laterally from said first upper member to define a first space, a first lower member extending vertically, a second lower member extending vertically and spaced laterally from said first lower member to define a second space, a lower arm interconnecting said first upper member and said second lower member, an upper arm interconnecting said second upper member and said first lower member, an intermediate arm interconnecting said second upper member and said second lower member, and a projection extending inwardly from said first lower member and said second lower member and opposing each other within said second space to restrain a respective on of the wiper assemblies therein, while said first space is free of projections engagable with the other of the wiper assemblies which is unrestrained within said first space; and
a center clamp adapted to be disposed about and retain the wiper assemblies together and to straighten the wiper assemblies for shipping in a package, said center clamp including a bottom wall, a top wall spaced from said bottom wall, a side wall interconnecting one side of said top wall and said bottom wall, a lower front wall extending upwardly from the other side of said bottom wall, and an upper front wall extending downwardly from the other side of said top wall, wherein said upper front wall and said lower front wall each have a flange extending from a free end thereof and being generally "U" shaped to engage each other and release from each other to hold the wiper assemblies in a straightened condition and prevent the wiper assemblies from being removed from said first and second spaces in said end spacers wherein said end spacers are held in compression between the wiper assemblies and said center clamp is held in tension by the wiper assemblies when the wiper assemblies are held in the straightened condition in the holder assembly.

* * * * *